June 14, 1949.                    H. J. PAYNTER                    2,472,849
                          APPARATUS FOR ELECTRICALLY
Filed Jan. 23, 1946          WELDING CONTAINER SEAMS                3 Sheets-Sheet 2
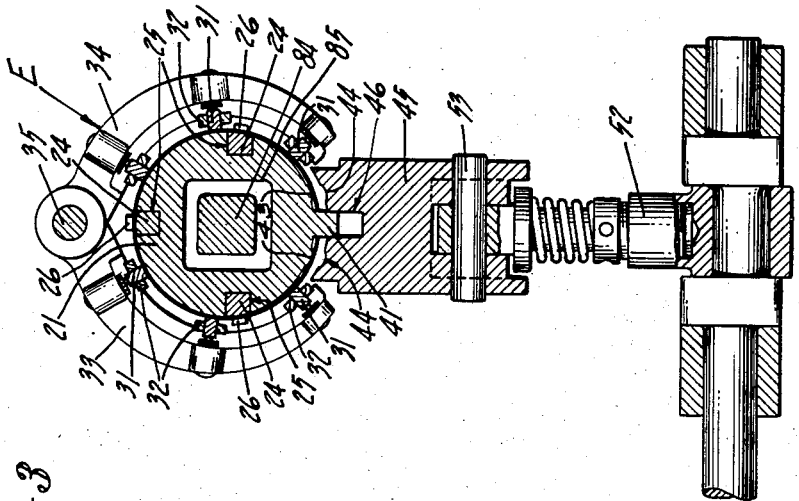
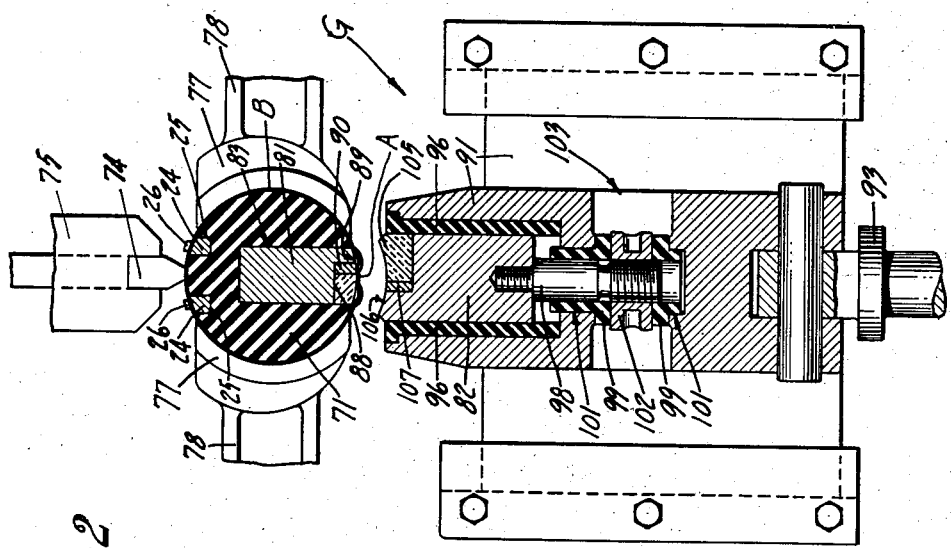
INVENTOR.
Horace J. Paynter
BY Ivan D. Thornburgh
Charles H. Erne
ATTORNEYS June 14, 1949.　　　　H. J. PAYNTER　　　　2,472,849
　　　　　　　APPARATUS FOR ELECTRICALLY
　　　　　　　　WELDING CONTAINER SEAMS
Filed Jan. 23, 1946　　　　　　　　　　3 Sheets-Sheet 3
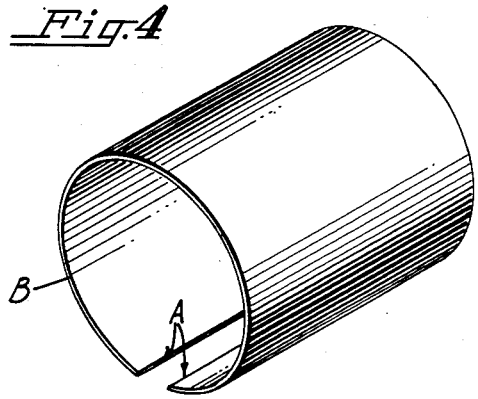
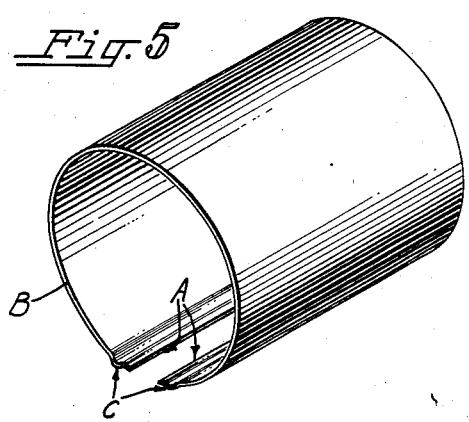
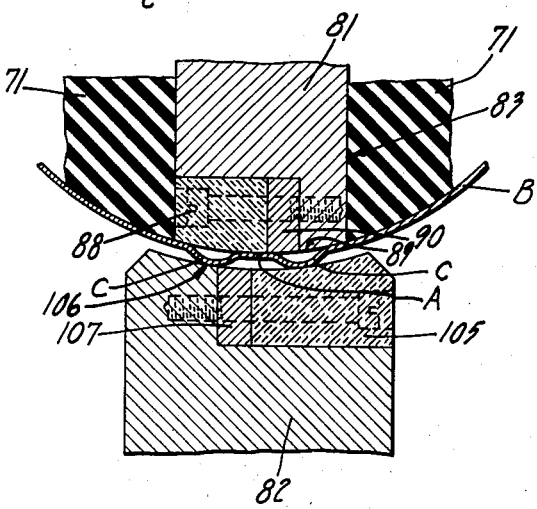
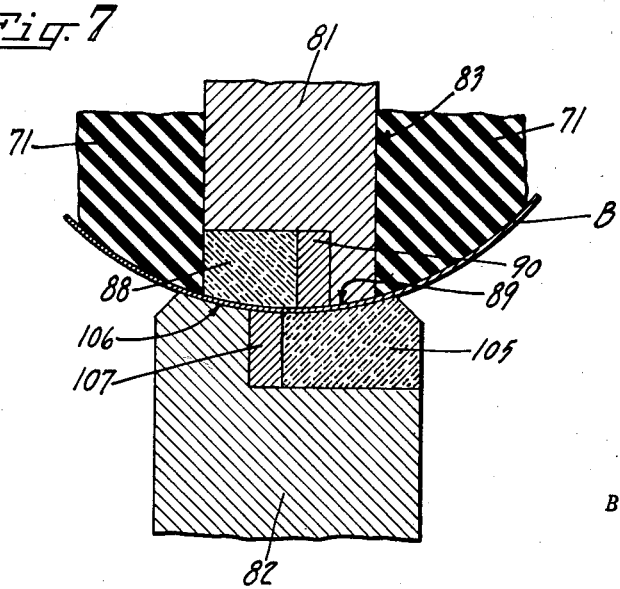
INVENTOR.
Horace J. Paynter
BY Ivan D. Thornburgh
Charles H. Erne
ATTORNEYS Patented June 14, 1949

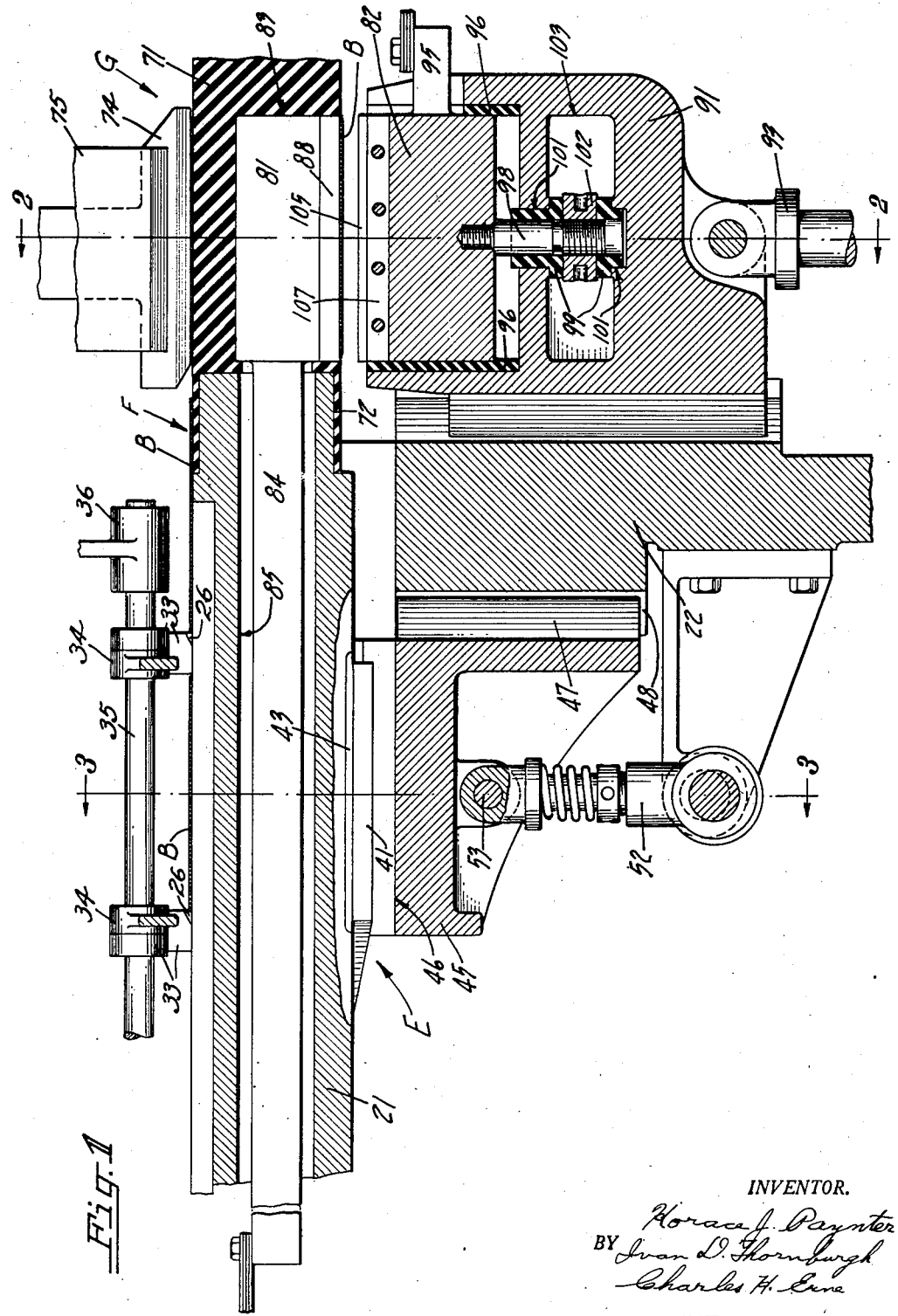

2,472,849

UNITED STATES PATENT OFFICE 2,472,849

APPARATUS FOR ELECTRICALLY WELDING CONTAINER SEAMS

Horace J. Paynter, Union, N. J., assignor to American Can Company, New York, N. Y., a corporation of New Jersey Application January 23, 1946, Serial No. 642,931

8 Claims. (Cl. 219—6)

1

The present invention relates to a machine for electric butt-welding of complementary edges of thin metallic sheet material, such as side seam edges of container or can bodies, and has particular reference to devices for pressing the edges together under high pressure for the welding operation for simultaneously welding the seam in its entirety.

A companion application covering a method of welding container seams was filed on January 23, 1946, in the United States Patent Office, Serial No. 642,930, on Method of welding container seams.

An object of the invention is the provision of a machine for electric butt-welding the full length simultaneously of complementary edges of thin metallic sheet material wherein the material adjacent the edges to be welded is pre-formed in such a manner that a pressure against the pre-formed material in a lateral direction creates and exerts a resultant pressure transversely of the edges to firmly press these edges together for the welding operation thereby producing an improved welded seam.

Another object is the provision of such a machine wherein the pre-formed material adjacent the edges to be welded is reformed in conjunction with the welding operation to provide a smooth welded joint.

Another object is the provision of a machine of this character wherein extrusion of the material at the seam is prevented so that the surface of the welded seam will be flush with the surfaces of the sheet material.

Another object is the provision of such a machine wherein the pre-forming of the seam edges, the welding of the edges, and the reforming of the edges may be effected in the same machine and with one passage through the machine so that high speed production and handling of the material to be welded is greatly facilitated.

Numerous other objects and advantages of the invention will be apparent as it is better understood from the following description, which, taken in connection with the accompanying drawings, discloses a preferred embodiment thereof.

Referring to the drawings:

Figure 1 is a longitudinal section taken through a machine embodying the instant invention, with parts broken away;

Figs. 2 and 3 are transverse sections taken substantially along the lines 2—2, 3—3 in Fig. 1, with parts broken away;

Fig. 4 is an enlarged perspective view of a can

2 body to be welded along its side seam in the machine shown in Figs. 1, 2 and 3;

Fig. 5 is a view similar to Fig. 4 showing the body after having its side seam edges pre-formed as an incident to welding these edges together; and Figs. 6 and 7 are enlarged sectional details of the machine shown in Fig. 1 and illustrating parts of the machine in different positions and showing the body edge portions in different stages of the welding operation.

As a preferred embodiment of the instant invention the drawings illustrate principal parts of a can body making machine of the type disclosed in United States Patent 1,770,041, issued July 8, 1930, to J. F. Peters on Roll bodymaker and modified to incorporate preforming and welding devices for butt-welding side seam edges A of sheet metal can bodies B (Fig. 4). Such can bodies preferably are made of tin plate or the like material.

The marginal portions adjacent the edges A of a can body B to be welded are first pre-formed to provide a pair of spaced and parallel curved corrugations C (Fig. 5). These corrugations extend along the entire length of the body and are disposed one adjacent each side seam edge A. The corrugations preferably extend outwardly of the body while leaving the edges A in line with each other and with the curved contour of the normal outline of the body although the invention is equally well adapted to inwardly projecting corrugations or to more than one pair of corrugations if these modifications are desirable. These corrugations stiffen the edges of the body and arrange the edges in parallel and lateral alignment so that they will readily come into abutting relation when lightly pressed together.

With the marginal portions of the body adjacent its edges A thus pre-formed, the edges are brought together in abutting engagement as shown in Fig. 6. The edges are temporarily held in this manner by a clamping action against the body. While the edges are so held in place a lateral pressure from opposed directions is exerted against the curved corrugations.

This pressure applied against the corrugations C is progressively increased and tends to flatten out the corrugations. At the same time the abutting edges A of the body are pressed together edgewise, i. e., in a direction transversely of the seam under a progressively increasing and exceedingly high pressure. This lateral pressure on the corrugations and the transverse pressure on the seam edges continues until the corrugations are entirely flattened out, as shown in Fig. 7. The result is a reforming of the material of the body adjacent its edges into a smooth even surface.

This flattening out of the corrugations C preferably is followed by a passage of electric welding current through the can body edge portions and across the abutting edges although the invention is equally well adapted to the application of this current simultaneously with the reforming of the corrugations C if such a method of operation is desired. This flow of welding current heats the abutting edges to a welding temperature and thus fuses or reduces the edges to a molten condition, while the high transverse pressure on these fused edges, brought about by the flattening of the corrugations C, completely units them in a greatly improved welded seam.

In the machine a can body B to be welded is supported on a horizontal mandrel 21 (Figs. 1 and 3) which extends the full length of the machine and which is secured in place in a main frame 22 as disclosed in the above mentioned Peters patent. The body surrounds the mandrel with the side seam edges A arranged in spaced relation and disposed under the mandrel. In this position the body is propelled along the mandrel in a step-by-step or intermittent manner toward the right as viewed in Fig. 1, by a plurality of reciprocating feed bars 24 which operate in grooves 25 formed in the mandrel. The bars are reciprocated in unison in any suitable manner such as disclosed in the Peters patent and they carry feed dogs 26 for engaging behind the body to effect its advancement along the mandrel.

The body B is retained in position on the mandrel 21 by a plurality of spring held pressure or guide blocks 31 carried in pressure bars 32 which extend along the mandrel in parallelism therewith. The bars are secured in segmental arms 33, 34 loosely mounted on a shaft 35 located above the mandrel. The ends of the shaft are carried in brackets 36 (one of which is shown in Fig. 1) bolted to the main frame 22.

During its stepped travel along the mandrel 21 a can body is brought to rest at a preforming station E (Figs. 1 and 3). Here the side seam edge portions of the body are preformed to provide the corrugations C as hereinbefore explained. At this station the mandrel is formed with a depending tongue 41 which extends along the body for a distance slightly greater than the length of a body to be pre-formed. The edges A of the body engage against opposite sides of this tongue under pressure of the guide blocks 31, as best shown in Fig. 3, and thus they are located in a predetermined spaced relation for the pre-forming operation. It is while the body is in this position that the corrugations C are formed.

The corrugations C are formed by a pair of beading projections 43 (Fig. 3) on the mandrel 21 cooperating with a pair of curved grooves 44 on a vertically movable slide member 45. Member 45 is located under the mandrel and the edges A of the body are disposed between these cooperating parts. The beading projections are formed on the mandrel in spaced and parallel relation to the tongue 41 and extend along the mandrel for a distance slightly greater then the length of a can body. There is one projection on each side of the tongue.

The beading grooves 44 are formed in the top surface of the slide member 45. This slide member extends along the mandrel for the full length of the pre-forming station and is provided with a pilot groove 46 which passes up and over the tongue 41 of the mandrel. The slide member is formed with a dove-tail slide 47 (see Fig. 1) which operates in a vertical slideway 48 formed on the main frame 22.

Vertical movement of the slide member 45 in its slideway 48 through an up or working stroke and thence through a down or return stroke is effected preferably through a pitman 52 (Figs. 1 and 3). The upper end of the pitman carries a pivot pin 53 on which the slide member is mounted. This pitman may be actuated in any suitable manner, such as for example through a crank shaft and a sprocket and chain connection, as disclosed in the Peters patent.

Hence when the slide member 45 is moved up through a working stroke it comes in contact with the pre-located side seam edge portions of a body at rest at the pre-forming station and squeezes them between the slide member and the mandrel 21. The beading projections 43 and the grooves 44 cooperate to form the corrugations C in the body edge portions. As soon as the slide member reaches the top of its up stroke it immediately moves down through its return stroke. During such return stroke, the feed bars 24 move the preformed body out of the preforming station and transfer it into an advanced idle station F (Fig. 1). Simultaneously a new body is brought into the preforming station for the creation of its corrugations C.

On the next stroke of the feed bars 24, the preformed body at the idle station F is advanced into a welding station G (Fig. 1). At this station the body is supported on a reduced diameter section 71 of the mandrel 21. This mandrel section 71 preferably is insulated from the main mandrel 21. By way of example, the drawings show this mandrel section 71 made as a separate piece of insulating material and formed with a sleeve portion 72. The sleeve portion surrounds and is secured to the adjacent end of the main mandrel.

When a preformed can body B comes to rest at the welding station G, it is clamped in position by a clamp bar 74 which is disposed above the mandrel section 71. This clamp bar preferably is made of insulating material and is carried in a bracket 75 secured to the main frame 22. The clamp bar is lowered into clamping position and is raised free of the body after a welding operation, in any suitable manner, such as that disclosed in the Peters patent.

When the body is fully clamped in position its side seam edges A are brought into contacting engagement, as shown in Figs. 2 and 6, by movement inwardly of the sides of the body the sides being pressed against the reduced diameter portion of the mandrel. This movement of the sides of the body is effected preferably by a pair of wings 77 (Fig. 2) disposed one on each side of the mandrel section 71. These wings preferably are made of insulating material and are carried on arms 78 which are movable toward and away from the mandrel section in suitable manner in time with the other moving parts of the machine, such as that disclosed in the Peters patent.

While the edges A of the body B are held in abutting engagement by the wings 77 they are welded together by a pair of oppositely disposed upper and lower electrodes 81, 82 located at the welding station G. The upper electrode 81 is disposed in a recess 83 formed in the mandrel section 71. The outer face of the electrode is flush with the outer periphery of the mandrel section.

This electrode is slightly longer than the length of the can body to be welded. At its inner end the electrode has a bus bar connection 84 (see Fig. 1) which extends through a clearance opening 85 in the main mandrel 21. At a suitable place of outlet it is connected to a source of electric welding current.

A removable hard ceramic insulating block 88 is disposed in a seat in the outer face of the upper electrode 81 adjacent one edge (at the left as viewed in Fig. 2) and extends along this face for slightly more than one half its width. This block reduces the welding current transmitting surface of the electrode to slightly less than one half its width, and thus provides a narrow electrode surface 89 (at the right as viewed in Fig. 2) adjacent the insulating block. A spacer block 90 is provided in the seat adjacent the insulating block for positioning the latter. This spacer is of electrical conducting material and forms a part of the electrode 81.

The lower electrode 82 is movable toward and away from the upper electrode 81 and for this purpose it is mounted in a vertically movable slide 91 which operates in a slideway 92 formed on the main frame 22. The slide is actuated through an up or welding stroke in any suitable manner in time with the other moving parts of the machine, for example, by a pitman 93, as disclosed in the Peters patent. A bus bar connection 95 is provided for connecting the lower electrode 82 to the source of welding current, while insulating pads 96 disposed adjacent the electrode on all sides thereof insulate the electrode from its slide 91.

Provision is made for vertically adjusting the lower electrode 82 for proper contact with the can body. For this purpose the electrode is supported on a stud 98 (Figs. 1 and 2) which is centrally disposed in the slide 91. The upper end of the stud is threadedly engaged in the bottom of the electrode. The stud extends down through a pair of spaced insulating collars 99 disposed in clearance holes 101 formed in the slide. The lower end of the stud is threaded and carries an adjusting nut 102 which is interposed between the insulating collars. Thus the stud and the nut are insulated from the slide. An opening 103 in the slide allows access to the nut.

Parts of the lower electrode 82 are similar in construction to the upper electrode 81, the lower electrode being provided in its upper or outer face with a removable hard ceramic insulating block 105. The block 105 is disposed in a seat formed in a corner of the electrode diagonally opposite the block 88 of the upper electrode 81. The inner surface of this lower insulating block 105 extends along the outer face of the lower electrode for slightly more than one half its width. Thus the lower block slightly overlaps the upper block 88, as best shown in Fig. 6. The lower block reduces the electric current transmitting surface of the lower electrode in the same manner as was done in the upper electrode and thus provides a narrow electrode surface 106. A spacer block 107 of electrical conducting material is provided for positioning the insulating block 105 in its seat.

The diagonally opposite and slightly overlapping positions of the insulating blocks 88, 105 in the two electrodes thus dispose the current transmitting surfaces 89, 106 of the electrodes in a diagonally and transversely separated relation. With this spaced relation of the current transmitting surfaces of the electrodes, the direct passage of current from one electrode to the other is prevented. Current can only be passed when both electrodes contact the can body and then only through the body across the seam to be welded.

Since in resistance welding the greatest efficiency is obtained when the welding current is applied as closely as possible to the edges to be welded, it will be seen that the diagonal relation of the current transmitting surfaces of the electrodes and the amount of overlap of the insulating blocks all assist in obtaining this efficiency. It has been found that for usual welding an overlap of one sixty-fourth of an inch of the insulating blocks is sufficient to effect good welds. With such an overlap therefore, the distance on each side of the weld line, i. e., from the edges of the body, will be one one-hundred twenty-eighth of an inch. Insulating blocks of different sizes and proper spacers may be inserted in the electrode seats and the amount of overlap may be thereby readily adjusted to suit any condition.

The mission of the wings 77 is to hold the edges A of the body B in light contacting engagement. The lower electrode moving up through its welding stroke first comes into contact with the corrugations C, as shown in Fig. 6. Thereupon the rising electrode exerts a lateral pressure against the corrugations as they are backed up by the upper electrode 81. This pressure tends to flatten out the corrugations and thus creates an edgewise or transverse thrust of the body edges A toward each other. It is this pressing together of these edges that provides the desired high pressure between them.

As the lower electrode 82 continues to move up the lateral pressure on the corrugations as well as the transverse pressure on the edges A increases progressively. This upward movement of the lower electrode and the progressive increasing of these pressures continue until the corrugations C are entirely flattened out. The marginal edge portions of the body are thus reformed to provide a smooth even surface for the body adjacent the side seam, as shown in Fig. 7. The lower electrode at this portion of its cycle is at the peak of its rising travel and is pressing the can body seam edges A tightly against the upper electrode 81. It is this flattening out of the corrugations C or the reforming of the marginal edge portions that presses the edges A together under the beneficial high pressure. This pressure on the edges A excludes the surrounding air from the seam and hence prevents oxidation of the metal during the following welding operation.

When the lower electrode 82 reaches the peak of its upward travel it holds the flattened or reformed edge portions of the body against displacement and hence the wings 77 may be moved away from the body resting on the mandrel if desired. Movement of the wings at such time may be dispensed with if desired and will doubtless be effected only if the wings are made of a current conducting material.

With the edges A of the body thus pressed tightly together the electric welding current hereinbefore mentioned is permitted to flow through the electrodes. Such a welding current passes through the can body edge portions and across the seam bringing the seam edges A to welding heat. This fuses the edges. This heating of the body edges while they are under the high pressure mentioned above completely unites them in a greatly improved strongly welded joint for the body.

At the termination of the welding operation, the welding current is cut off and the lower electrode 82 moves down through its return stroke leaving the welded can body on the mandrel. It is then in condition for further advancement or for discharge upon the next forward stroke of the feed bars 24. This completes the welding cycle.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A machine for electric butt-welding the full length simultaneously of complementary edges of thin metallic sheet material such as the side seam edges of can bodies, comprising in combination a mandrel for supporting a can body, forming means secured in part in said mandrel for forming corrugations adjacent to and extending longitudinally of the edges to be welded, means for shifting said edges and corrugations to a second position on said mandrel devices for bringing the body edges together and holding them in abutting relation along their full length while on said mandrel at said second position, electrodes facing opposite sides of said corrugations and edges for passing an electric current through the can body from one of said abutting edges to the other across the seam to heat the edges to a welding temperature and to weld the edges together, and means for pressing said electrodes together with the corrugations of the body therebetween and while said devices hold the material for flattening out the corrugations thereby forcing the abutting edges together under a high pressure for the welding operation.

2. A machine for electric butt-welding the full length simultaneously of complementary edges of thin metallic sheet material such as the side seam edges of can bodies, comprising in combination a mandrel for supporting a can body, feeding devices for advancing a can body along said mandrel, forming means secured in part to said mandrel for forming corrugations adjacent to and extending longitudinally of the edges to be welded, means for retaining said corrugations and edges in predetermined paths as the can bodies are advanced devices located in an advanced position on said mandrel for clamping the can body thereon with said corrugations exposed and for moving said body edges laterally of their predetermined paths and holding them in abutting relation along their full length, electrodes located in said advanced position for passing an electric current through the can body from one of said abutting edges to the other across the seam to heat the edges to a welding temperature and to weld the edges together, and means for pressing said electrodes together with the corrugations of the body therebetween and while said devices clamp the rest of the body for flattening out the corrugations thereby forcing the abutting edges together under a high pressure for the welding operation.

3. A machine for electric butt-welding the full length simultaneously of complementary edges of thin metallic sheet material such as the side seam edges of can bodies, comprising in combination a stationary mandrel for supporting a can body, forming means secured in part to said mandrel for forming corrugations adjacent to and extending longitudinally of the edges to be welded, means for shifting said edges and corrugations to a second position on said mandrel devices for clamping the can body on said mandrel at said second position with said corrugations exposed and with the body edges in abutting relation along their full length, a stationary electrode mounted in said mandrel at said second position and facing one side of said corrugations and edges, a movable electrode opposed to and movable toward said stationary electrode for pressing the corrugations of the body between said electrodes to flatten out the corrugations thereby forcing the abutting edges together under a high pressure, and means for passing an electric current between said electrodes and through the can body from one of said abutting edges to the other across the seam to heat said edges to a welding temperature to weld the edges in a side seam.

4. A machine for electric butt-welding the full length simultaneously of complementary edges of thin metallic sheet material such as the side seam edges of can bodies, comprising in combination a stationary mandrel for supporting a can body, stationary forming elements secured in said mandrel, cooperating movable forming elements disposed adjacent said stationary elements said elements cooperating for forming corrugations adjacent to and extending longitudinally of the body edges to be welded, means for shifting said edges and corrugations to a second position on said mandrel devices for clamping the can body on said mandrel at said second position with said corrugations exposed and with the edges in abutting relation along their full length, a stationary electrode mounted in said mandrel at said second position and facing one side of said corrugations and edges, a movable electrode located in opposition to and movable toward the stationary electrode for pressing the corrugations of the body between said electrodes to flatten out the corrugations thereby forcing the abutting edges together under a high pressure, and means for passing an electric current between said electrodes and through said can body from one of said abutting edges to the other across the seam to heat said edges to a welding temperature to weld the edges in a side seam.

5. In a machine for electric butt-welding complementary abutting edges of thin metallic sheet material such as the side seam edges of can bodies having corrugated edges, the combination of a mandrel for supporting a can body with its corrugated edges abutting, a pair of opposed electrodes between which the abutting edges are disposed for passing an electric current through said material from one of said abutting edges to the other across the seam for welding the edges together, one of said electrodes being mounted in said mandrel and inside of the can body thereon, the other of said electrodes being outside of the body, a block of electrically insulating material in each of said electrodes, said blocks being disposed in overlapped and diagonal relation for defining the contact between the electrodes and the body to direct the electric current through the seam from one edge to the other, and means for moving one of said electrodes to flatten the corrugations of the abutting edges of the body to weld the edges in a side seam.

6. A machine for electric butt-welding the full length simultaneously of complementary edges of thin metallic sheet material such as the side seam edges of can bodies having beaded formations formed parallel with said seam edges, comprising in combination means for bringing said edges into abutting relation, straightening means for reforming said corrugated portions of the sheet, said straightening means comprising opposing members between which said corrugations are reformed and between which said abutting edges are closely confined, an insert of dielectric material in the working face of each of said straightening elements in diagonally opposed and overlapping relation relative to each other and electrode elements constituting the remaining portions of the working faces of said straightening members whereby a welding current is passed from one of said abutting edges to the other to create a fusing temperature and thereby weld said edges together while the edges are being urged one toward the other under the increased pressure effected by said straightening of the corrugated portions adjacent said abutting edges.

7. A machine for electric butt-welding the full length simultaneously of complementary edges of thin metallic sheet material such as the side seam edges of can bodies, comprising in combination a mandrel for supporting said material, forming means associated with said mandrel for forming corrugations adjacent to and extending longitudinally of the edges to be welded, a spacing tongue adjacent said mandrel for gauging and separating said edges during formation of the corrugations, means for moving said material along said mandrel and for maintaining said gauged positions of the edges during said movement butting devices for bringing the formed edges into abutting relation and for holding them in said relation along the full length of the edges at another portion of said mandrel, a pair of oppositely disposed electrodes adjacent said butting devices and in longitudinal alignment with said spacing tongue for passing an electric current through said material from one of said abutting edges to the other across the seam to heat said edges to a welding temperature, and means for moving said electrodes to exert a pressure on said corrugations from opposed lateral directions to reform the corrugations thereby forcing the abutting edges together in a transverse edgewise direction and under an increased pressure while the material is held by said butting devices.

8. A machine for electric butt-welding the full length simultaneously of complementary edges of thin metallic sheet material such as the side seam edges of can bodies, comprising in combination, a mandrel for supporting a can body to be welded, feeding devices for advancing the can body along said mandrel through a plurality of stations in a step-by-step manner, stationary forming elements in said mandrel at one of said stations for providing corrugations adjacent to and extending longitudinally of the edges of the can body to be welded, movable forming elements disposed adjacent to and movable toward said mandrel for cooperating with said stationary forming elements in providing said corrugations, means for retaining said corrugations and edges in predetermined paths as the can bodies are advanced, a pair of wings adjacent said mandrel at another station and movable toward the mandrel for moving said body edges laterally of their predetermined paths and holding them in abutting relation along the full length of said edges, a stationary electrode in said mandrel adjacent the path of said edges and insulated from said mandrel, and a movable electrode disposed outside said mandrel and in opposed relation to said stationary electrode for receiving the abutting edges and adjacent corrugations of the can body between them, said movable electrode being movable toward said stationary electrode for exerting a pressure on said corrugations while the material is held by said wings for flattening out the corrugations against said stationary electrode and for forcing the abutting edges together in a transverse edgewise direction under a high pressure, said electrodes passing an electric current through said can body from one of said abutting edges to the other across the seam while said edges are maintained under high pressure for heating the edges to a welding temperature for welding them together.

HORACE J. PAYNTER.

REFERENCES CITED

The following references are of record in the file of this patent:

UNITED STATES PATENTS

| Number | Name | Date |
|---|---|---|
| 1,101,447 | Jones | June 23, 1914 |
| 1,190,902 | Hood | July 11, 1916 |
| 1,375,687 | Forsyth | Apr. 26, 1921 |
| 1,628,928 | Taylor | May 17, 1927 |
| 1,816,864 | Murray | Aug. 4, 1931 |
| 1,887,488 | Hoffer | Nov. 15, 1932 |
| 2,047,964 | Hothersall | July 21, 1936 |
| 2,092,003 | Mitchell | Sept. 7, 1937 |
| 2,385,710 | Kershaw | Sept. 25, 1945 |

FOREIGN PATENTS

| Number | Country | Date |
|---|---|---|
| 455,366 | Great Britain | Jan. 11, 1935 |